(12) United States Patent
Futa et al.

(10) Patent No.: US 9,234,465 B2
(45) Date of Patent: Jan. 12, 2016

(54) FUEL FLOW DIVIDER AND ECOLOGY SYSTEM FOR A GAS TURBINE ENGINE FUEL FLOW CONTROL SYSTEM

(75) Inventors: Paul Futa, North Liberty, IN (US); Brad McRoberts, Mishawaka, IN (US); Greg Lafferty, South Bend, IN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1153 days.

(21) Appl. No.: 13/085,107

(22) Filed: Apr. 12, 2011

(65) Prior Publication Data

US 2012/0261000 A1    Oct. 18, 2012

(51) Int. Cl.
*F02C 9/26*    (2006.01)
*F02C 7/232*    (2006.01)

(52) U.S. Cl.
CPC .................. *F02C 9/263* (2013.01); *F02C 7/232* (2013.01); *Y10T 137/2524* (2015.04)

(58) Field of Classification Search
CPC .............. F02C 7/232; F02C 7/22; F02C 7/26; F02C 7/222; F02C 9/32; F02C 9/28; F05B 2260/602; F23R 3/28; F15B 13/022; B62D 5/07; F16K 5/12; F16K 39/04; Y10T 137/86493–137/86895; Y10T 137/86011; Y10T 137/86928

USPC ................. 60/39.094, 39.281, 243, 790, 739; 137/101, 625.12

See application file for complete search history.

(56) References Cited

U.S. PATENT DOCUMENTS

| | | | |
|---|---|---|---|
| 5,809,771 A | 9/1998 | Wernberg | |
| 6,484,510 B2* | 11/2002 | Futa et al. | 60/790 |
| 6,675,570 B2 | 1/2004 | Herbison et al. | |
| 6,751,939 B2 | 6/2004 | Futa, Jr. et al. | |
| 6,877,306 B2 | 4/2005 | Wernberg et al. | |
| 6,941,754 B2 | 9/2005 | Aldridge et al. | |
| 7,093,420 B2 | 8/2006 | Futa, Jr. et al. | |
| 7,137,242 B2 | 11/2006 | Griffiths | |
| 7,200,985 B2 | 4/2007 | Tuttle et al. | |
| 2010/0037612 A1* | 2/2010 | Futa et al. | 60/734 |
| 2010/0050593 A1* | 3/2010 | Futa et al. | 60/39.094 |

* cited by examiner

*Primary Examiner* — William H Rodriguez
*Assistant Examiner* — Jared W Pike
(74) *Attorney, Agent, or Firm* — Ingrassia Fisher & Lorenz, P.C.

(57) ABSTRACT

A flow divider valve for a gas turbine engine fuel supply system is provided. The flow divider valve is configured, whenever fuel pressure at its inlet port is between a first predetermined pressure and a second predetermined pressure, to supply the fuel to a start nozzle manifold outlet port at a substantially constant flow rate, and to direct any fuel flow in excess of the substantially constant flow rate to a run nozzle manifold outlet port.

14 Claims, 7 Drawing Sheets

FUEL FLOW DIVIDER AND ECOLOGY SYSTEM FOR A GAS TURBINE ENGINE FUEL FLOW CONTROL SYSTEM

TECHNICAL FIELD

The present invention generally relates to gas turbine engine fuel supply and control systems, and more particularly relates to a fuel flow divider and ecology system for gas turbine engine fuel flow control systems.

BACKGROUND

Some gas turbine engine fuel flow control systems are configured to controllably split total burn flow between primary (or start) fuel nozzles and secondary (or run) fuel nozzles during engine startup. In some known fuel flow control system, such as the one disclosed in U.S. Pat. No. 6,484,510, a flow divider valve is used to vary the flow split as a function of total burn flow. In other words, fuel flow to the start nozzles is controllably increased as a percentage of total flow scheduled to the engine. More specifically, as total burn flow increases during the engine start sequence, a greater percentage of flow, up to a predetermined value of total burn flow, is routed to the start fuel nozzles. When the total burn flow exceeds the predetermined value, the flow divider valve routes equal amounts of flow to the primary and secondary fuel nozzles. While this technique generally satisfies the flow spit functionality for engine startup, it can undesirably increase primary flow just after engine startup. This can result in heat induced engine combustor distress in the areas adjacent to the primary fuel nozzles.

Many fuel flow control systems, including those described above, also include an ecology valve. The ecology valve, which is connected to the primary and secondary fuel nozzles, is configured to extract a predetermined amount of fuel from the primary and secondary fuel nozzle manifolds during engine shutdown. The ecology valve is additionally configured, after a subsequent engine startup, to return the extracted fuel to the engine. In many instances, the ecology valve may be configured to return some of the fuel during the engine startup sequence. This can adversely impact the scheduled burn flow to the primary and secondary fuel nozzles, which can in turn adversely impact engine ignition.

In addition to the above, some engine applications rely on fuel staging. With fuel staging, fuel flow to certain run nozzles, sometimes referred to as staged nozzles, is blocked at lower total burn flow conditions, such as ground idle, to improve engine emissions. If fuel staging is incorporated, it is desirable to provide a means to override the fuel blockage to the staged nozzles to guard against heat induced engine combustor distress at total burn flow rates above a predetermined level.

In view of the foregoing, there is a need for a fuel flow control system that is configured to control flow to the start nozzles during engine startup to predetermined constant flow rate, with the remainder directed to the run nozzles, rather than simply increasing this flow as percentage of total burn flow. There is also a need for a fuel control system that is configured to equalize the total burn flow to the start and run fuel nozzles after engine startup. There is additionally a need for a fuel control system that is configured such that the ecology valve does not adversely impact scheduled burn flow to the primary and secondary fuel nozzles during engine startup. There is a further need for a fuel flow control system that is configured to override fuel blockage to staged nozzles. The present invention addresses one or more of these needs.

BRIEF SUMMARY

In one embodiment, a flow divider valve is provided for controlling fuel flow to a gas turbine engine that includes a start nozzle manifold and a run nozzle manifold. The flow divider valve includes a valve body, a start flow orifice, and a flow divider valve element. The valve body includes an inlet port, a start nozzle manifold outlet port, a run nozzle manifold outlet port, and an inner surface that defines a valve chamber. The start flow orifice is disposed between the inlet port and the start nozzle manifold outlet port. The flow divider valve element is disposed within the valve chamber and is movable therein between a closed position and a plurality of open positions. The flow divider valve element includes an inner surface, an outer surface, and a flow regulation port. The inner surface defines an internal channel, and the flow regulation port extends through the flow divider valve element between the inner surface and the outer surface and provides fluid communication between the internal channel and the run nozzle manifold outlet port. The flow divider valve element is configured such that, when the flow divider valve element is in the closed position, the inlet port is fluidly isolated from the start nozzle manifold outlet port, the run nozzle manifold outlet port, and the internal channel. It is also configured such that, when fuel pressure at the inlet port is between a first predetermined pressure and a second predetermined pressure, the flow divider valve element is in one or more of the open positions and the inlet port is in fluid communication with the start nozzle manifold outlet port via the start flow orifice and the run nozzle manifold outlet port via the internal flow channel and the flow regulation port, and fuel flow through the start flow nozzle manifold outlet port is substantially constant regardless of fuel flow into the inlet port.

In another embodiment, a flow divider and ecology system is provided for a gas turbine engine that includes a start nozzle manifold and a run nozzle manifold, the system includes a flow divider valve body, a flow divider valve element, an ecology valve body, and an ecology valve element. The flow divider valve body includes an inlet port, a start nozzle manifold outlet port, a run nozzle manifold outlet port, a start flow orifice disposed between the inlet port and the start nozzle manifold outlet port, and an inner surface that defines a flow divider valve chamber. The flow divider valve element is disposed within the flow divider valve chamber and is movable therein between a closed position and a plurality of open positions. The flow divider valve element includes an inner surface, an outer surface, and a flow regulation port. The inner surface defines an internal channel, and the flow regulation port extends through the flow divider valve element between the inner surface and the outer surface and provides fluid communication between the internal channel and the run nozzle manifold outlet port. The ecology valve body includes a control pressure port, a burn flow pressure port, a run nozzle pressure port, and an inner surface that defines an ecology valve chamber. The burn flow pressure port is in fluid communication with the internal channel of the flow divider valve element, and the run nozzle pressure port is in fluid communication with the run nozzle manifold outlet port. The ecology valve element is disposed within the ecology valve chamber and is movable therein between a plurality of positions. The ecology valve element divides the ecology valve chamber into a variable volume control chamber and a variable volume fuel reservoir. The variable volume control chamber is in fluid communication with the control pressure port. The ecology valve element is configured, in response to fuel pressure at the control pressure port, to selectively place the variable volume fuel reservoir in fluid communication with one of the burn flow pressure port and the run nozzle pressure port. The flow divider valve element is configured such that, when the flow divider valve element is in the closed position, the inlet port is fluidly isolated from the start nozzle manifold outlet port, the run nozzle manifold outlet port, and the internal channel. When fuel pressure at the inlet port is between a first predetermined pressure and a second predetermined pressure, the flow divider valve element is in one or more of the open positions and the inlet port is in fluid communication with the start nozzle manifold outlet port via the start flow orifice and the run nozzle manifold outlet port via the internal flow channel and the flow regulation port, and fuel flow through the start flow nozzle manifold outlet port is substantially constant regardless of fuel flow into the inlet port.

In yet another embodiment, a gas turbine engine fuel control system includes a pump, a fuel metering valve, and a flow divider valve. The pump is configured to selectively discharge fuel at a discharge pressure. The fuel metering valve is coupled to receive the fuel discharged from the pump, and includes a variable area flow orifice through which at least a portion of the fuel is discharged at a fuel pressure. The flow divider valve includes an inlet port, a start nozzle manifold outlet port, and a run nozzle manifold outlet port. The inlet port is coupled to at least selectively receive the fuel discharged from the fuel metering valve, the start nozzle manifold outlet port is configured to couple to a start nozzle manifold in a gas turbine engine combustor, and the run nozzle manifold outlet port is configured to couple to a run nozzle manifold in the gas turbine engine combustor. The flow divider valve is configured, whenever fuel pressure at the inlet port is between a first predetermined pressure and a second predetermined pressure, to supply the fuel to the start nozzle manifold outlet port at a substantially constant flow rate, and to direct any fuel flow in excess of the substantially constant flow rate to the run nozzle manifold outlet port.

Furthermore, other desirable features and characteristics of the flow divider valve, flow divider and ecology system, and fuel flow control system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
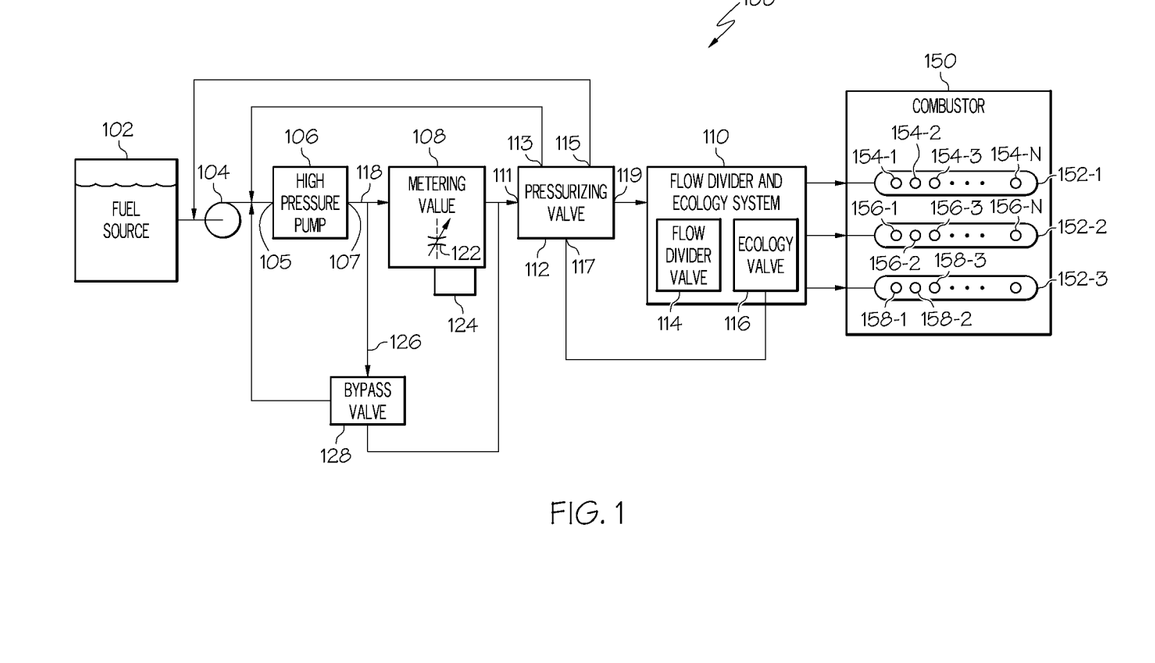
FIG. 1 depicts a functional block diagram of one example embodiment of at least a portion of a gas turbine engine fuel flow control system.

FIG. 1 depicts a block diagram of an exemplary embodiment of a gas turbine engine fuel flow control system 100. The depicted system 100 includes a fuel source 102, one or more pumps 104, 106, a metering valve 108, a pressurizing valve 112, and a flow divider and ecology system 110. The fuel source 102, which is preferably implemented as one or more tanks, stores fuel that is to be supplied to one or more fuel loads, such as a combustor 150.

The one or more pumps 104, 106 are positioned in flow-series in a supply line 118 and draw fuel from the fuel source 102. In the depicted embodiment, a boost pump 104, such as a relatively low horsepower centrifugal pump, and a high-pressure fuel metering pump 106 are used. The boost pump 104 draws fuel directly from the fuel source 102 and provides sufficient suction head for the high pressure pump 106. The boost pump 104 may be either mechanically driven by the engine, or electrically driven by a non-illustrated motor. Although not depicted, it will be appreciated that the system 100 may additionally include a low pressure pump within the fuel tank(s) 102 to supply fuel to the boost pump 104. Moreover, the boost pump 104 may, in some embodiments, not be included.

The high pressure pump 106 includes a pump inlet 105 and a pump outlet 107, and is coupled to be controllably energized from, for example, a non-illustrated power source. The high pressure pump 106 is configured, upon being energized, to draw fuel into the pump inlet 105 and the discharge fuel, at a relatively high pump discharge pressure, out the pump outlet 107. The high pressure pump 106 may be variously configured and implemented. For example, the high pressure pump 106 may be a positive displacement pump or a centrifugal pump.

The metering valve 108 is positioned in flow-series in the supply line 118 downstream of the high pressure pump 106. The metering valve 108 includes a variable area flow orifice 122 through which a portion of the fuel in the supply line 118 flows. A metering valve control device 124 may be used to adjust the position of the metering valve 108, and thus the area of the variable area flow orifice 122. It will be appreciated that the metering valve 108 and the control device 124 may be implemented using any one of numerous types of components. For example, the metering valve 108 could be an electrically operated valve, a hydraulically-operated valve, or a pneumatic valve. Moreover, the control device 124 may be implemented as an electro-hydraulic servo valve (EHSV), an electric motor, or an independent controller, just to name a few. In any case, fuel flow rate to the combustor 150 is, under normal circumstances, controlled by adjusting the position of the metering valve 108, and thus the area of the first variable area flow orifice 122.

As FIG. 1 additionally depicts, the system 100 may also include a bypass flow line 126. The bypass flow line 126, if included, is connected to the supply line 118 between the high pressure pump 106 and the metering valve 108, and selectively bypasses a portion of the fuel in the supply line 118 back to the inlet of the high pressure pump 106. To do so, the bypass flow line 126 includes a bypass valve 128 that is positioned in response to pressure upstream and downstream pressure of the metering valve 108, to selectively divert fuel flow in the supply line 118 away from the metering valve 108, and thus the combustor 150, back through the bypass flow line 126 to the inlet 105 of the high pressure pump 106, to maintain a constant head or pressure drop across the metering valve 108.

The pressurizing valve 112 is configured to maintain a minimum pressure magnitude in the supply line 118 downstream of the metering valve 108, and shuts when the pressure falls below this minimum pressure magnitude. To do so, the depicted pressurizing valve 112 includes a burn flow inlet port 111, a return pressure sense port 113, a pump inlet pressure port 115, an ecology control pressure port 117, and a burn flow outlet port 119. The pressurizing valve 112 is configured to open, and thus place the burn flow inlet port 111 in fluid communication with the burn flow outlet port 119, when the fuel pressure between the burn flow inlet port 111 and pump inlet pressure port 115 is at or above a predetermined differential pressure magnitude. The pressurizing valve 112 is configured to close, and thus fluidly isolate the burn flow inlet port 111 from the burn flow outlet port 119, when that pressure differential drops below a predetermined magnitude. The pressurizing valve 112 is additionally configured to selectively place the ecology control pressure port 117 in fluid communication with either the pump inlet pressure port 115 or the burn flow inlet port 111. As will be described further below, this latter functionality controls a portion of the flow divider and ecology system 110.

Before describing the flow divider and ecology system 110, it is noted that the depicted combustor 150 includes a plurality of fuel manifolds 152. It will be appreciated that the number of fuel manifolds 152 may vary, but in the depicted embodiment, the combustor 150 includes three fuel manifolds, a start nozzle manifold 152-1, a run nozzle manifold 152-2, and a staged nozzle manifold 152-3. As may be appreciated, fuel nozzles are coupled to each of the fuel manifolds 152. In particular, a plurality of start nozzles 154 (154-1, 154-2, 154-3, . . . 154-N) are coupled to the start nozzle manifold 152-1, a plurality of run nozzles 156 (156-1, 156-2, 156-3, . . . 156-N) are coupled to the run nozzle manifold 152-2, and a plurality of staged nozzles 158 (158-1, 158-2, 158-3, . . . 158-N) are coupled to the staged nozzle manifold 152-3. It will be appreciated that the number and configuration of each of the start, run, and staged nozzles 154, 156, 158 may vary.

Figure 2:
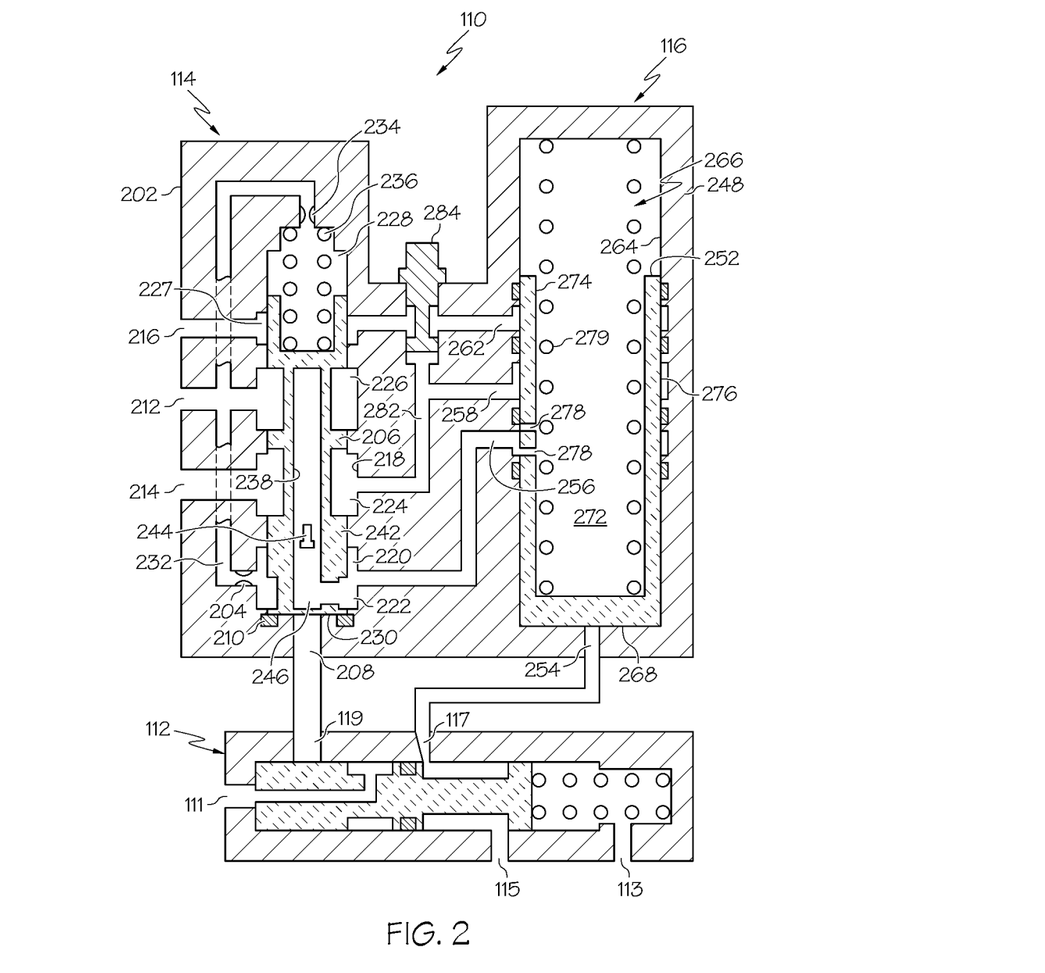
FIGS. 2-7 depict a particular embodiment of a flow divider valve and ecology system that may be implemented in the system of FIG. 1, and with the flow divider valve and/or ecology valve in various positions.

Referring to both FIG. 1 and FIG. 2, the depicted flow divider and ecology system 110 includes a flow divider valve 114 and an ecology valve 116. The flow divider valve 114 is coupled to receive fuel from the pressurizing valve 112, and selectively deliver the fuel to the start nozzle manifold 152-1, the run nozzle manifold 152-2, and the staged nozzle manifold 152-3. More specifically, the flow divider valve 114 is configured to supply fuel at a substantially constant flow rate to the start nozzle manifold 152-1 during engine start up, and up to a predetermined total burn flow rate. Any fuel flow in excess of the substantially constant flow rate is directed to the run nozzle manifold 152-2. After engine startup, and at a second predetermined total burn flow rate, burn flow the flow divider valve 114 equalizes fuel flow to the start nozzle manifold 152-1 and run nozzle manifold 152-2. The flow divider valve 114 is also configured to block fuel flow to the staged nozzle manifold 152-3 until the total burn flow rate reaches a third predetermined total burn flow rate, which is greater than the second predetermined total burn flow rate.

The ecology valve 116 is in fluid communication with the flow divider valve 114 and the pressurizing valve 112. The ecology valve 116 is configured, in response to fuel pressure at the ecology control pressure port 117, to selectively extract fuel from the fuel manifolds 152, via the flow divider valve 114, during engine shutdown. The ecology valve 116 is additionally configured, during and after engine startup, and in response to fuel pressure at the ecology control pressure port 117, to return the extracted fuel, via the flow divider valve 114, to the fuel manifolds 152.

The flow divider and ecology system 110 may be variously configured to implement the various functions described above. A particular embodiment of the flow divider valve and ecology system 110, connected to an embodiment of the pressurizing valve 112, and configured to implement the described functions, is depicted schematically in FIGS. 2-7, and will now be described in more detail.

Referring to FIG. 2, an embodiment of the flow divider valve 114 will first be described. The depicted flow divider valve 114 includes a valve body 202, a start flow orifice 204, and a flow divider valve element 206. The valve body 202 includes an inlet port 208, a start nozzle manifold outlet port 212, a run nozzle manifold outlet port 214, and in some embodiments a staged nozzle manifold outlet port 216. The valve body 202 additionally includes an inner surface 218 that defines a valve chamber 220. The valve body 202 and flow divider valve element 206 are configured to define, within the valve chamber 220, an inlet chamber 222, a run nozzle manifold chamber 224, a start nozzle manifold chamber 226, a stage nozzle manifold chamber 227, and a control chamber 228.

The start flow orifice 204 is disposed between the inlet port 208 and the start nozzle manifold outlet port 212. More specifically, at least in the depicted embodiment, the start flow orifice 204 is disposed within a flow control channel 232 that extends between the inlet chamber 222 and the control chamber 228. The flow control channel 232 is disposed such that the control chamber 228 is in continuous fluid communication with the inlet chamber 222, via the start flow orifice 204, and is also in continuous fluid communication with the start nozzle manifold chamber 226. As FIG. 2 further depicts, a damping orifice 234 may be disposed in the flow control channel 232 between the start nozzle manifold chamber 226 and the control chamber 228, and a valve bias spring 236 is disposed within the control chamber 228. The valve bias spring 236 engages the valve body 202 and the flow divider valve element 206, and urges the flow divider valve element 206 toward a closed position, which is the position depicted in FIG. 2. In the closed position, an end surface 230 of the flow divider valve element 206 contacts a soft seat 210, providing a means to prevent leakage to fuel manifolds 152 when the flow divider valve element 206 is in the closed position.

The flow divider valve element 206 is disposed within the valve chamber 220 and is movable therein between the closed position and a plurality of open positions. The depicted flow divider valve element 206 includes an inner surface 238, an outer surface 242, and one or more flow regulation ports 244 (for clarity, only one depicted). The inner surface 238 defines an internal channel 246. The one or more flow regulation ports 244 extend through the flow divider valve element 206 between the inner surface 238 and the outer surface 242, and provide continuous fluid communication between the internal channel 246 and at least the run nozzle manifold outlet port 214. More specifically, the run nozzle manifold outlet port 214 is in continuous fluid communication with the inlet chamber 222 via the run nozzle manifold chamber 224, the one or more flow regulation ports 244, and the internal channel 246, when the position of the flow divider valve element 206 is in an open condition.

Turning now to a description of the ecology valve 116, this valve includes an ecology valve body 248 and an ecology valve element 252. The ecology valve body 248 includes a control pressure port 254, a burn flow port 256, a run nozzle port 258, a staged nozzle port 262, and an inner surface 264 that defines an ecology valve chamber 266. The control pressure port 254 is in fluid communication with the ecology control pressure port 117 of the pressurizing valve 112. The burn flow port 256 is in fluid communication with the internal channel 246 of the flow divider valve element 206 (via the inlet chamber 222), the run nozzle port 258 is in fluid communication with the run nozzle manifold outlet port 214 (via the run nozzle manifold chamber 224), and the staged nozzle port 262 is in fluid communication with staged nozzle manifold outlet port 216 (via the stage nozzle manifold chamber 227).

The ecology valve element 252 is disposed within the ecology valve chamber 266, and is movable therein to a plurality of positions. The ecology valve element 252 divides the ecology valve chamber 266 into a variable volume control chamber 268 (most visible in FIGS. 3-7) and a variable volume fuel reservoir 272. The variable volume control chamber 268 is in fluid communication with the control pressure port 254.

The ecology valve element 252 additionally includes an inner surface 274, an outer surface 276, and a plurality of flow orifices 278 (only two depicted) that extend between the inner surface 274 and the outer surface 276. An ecology valve spring 279 is disposed in the variable volume fuel reservoir 272. The ecology valve spring 279 engages the ecology valve body 248 and the ecology valve element 252, and urges the ecology valve element 252 toward the position depicted in FIG. 2, which is referred to herein as the "non-energized position." The ecology valve element 252 is configured, in response to fuel pressure at the control pressure port 254, to move from the non-energized position to an energized position, and thereby selectively place the variable volume fuel reservoir 272 in fluid communication with the burn flow port 256, the run nozzle port 258, or the staged nozzle port 262, via one or more of the flow orifices 278.

Having described the structural configuration of each of the depicted flow divider valve 114 and the ecology valve 116, and having also described the general functionalities of each, a more detailed description of the operations of the flow divider valve 114 and the ecology valve 116 will now be provided. In doing so, it is assumed that fuel flow through the gas turbine engine fuel flow control system 100 has just commenced. Thus, the pressurizing valve 112 is closed, and the flow divider valve 114 and the ecology valve 116 are each configured as depicted in FIG. 2. In this configuration, the flow divider valve element 206 is in the closed position, and the ecology valve element 252 is in the depicted position. When the flow divider valve element 206 is in the closed position, the inlet port 208 is fluidly isolated from the start nozzle manifold outlet port 212, the run nozzle manifold outlet port 214, the staged nozzle manifold outlet port 216, and the internal channel 246.

When the pressurizing valve 112 is closed, the ecology control pressure port 117 is in fluid communication with the pump inlet pressure port 115. Thus, the variable volume control chamber 268 is in fluid communication with the inlet of the low pressure pump 104. The ecology valve spring 279 overcomes the pressure at the control pressure port 254, and causes the ecology valve element 252 to be in its non-energized position. Additionally, the pressurizing valve burn flow inlet port 111 is fluidly isolated from the burn flow outlet port 119.

As may be appreciated, the flow divider valve element 206 is positioned in response to the total burn flow pressure acting on one of its ends, and the combined pressure from the valve bias spring 236 and fuel pressure at the start nozzle manifold outlet port 212 acting on its opposite end. When total burn flow pressure at the inlet port 208 reaches a predetermined amount above the pressure at the start nozzle manifold outlet port 212, which is set by the valve bias spring 236, the flow divider valve element 206 begins to open, and the ecology valve element 252 begins to move.

Figure 3:
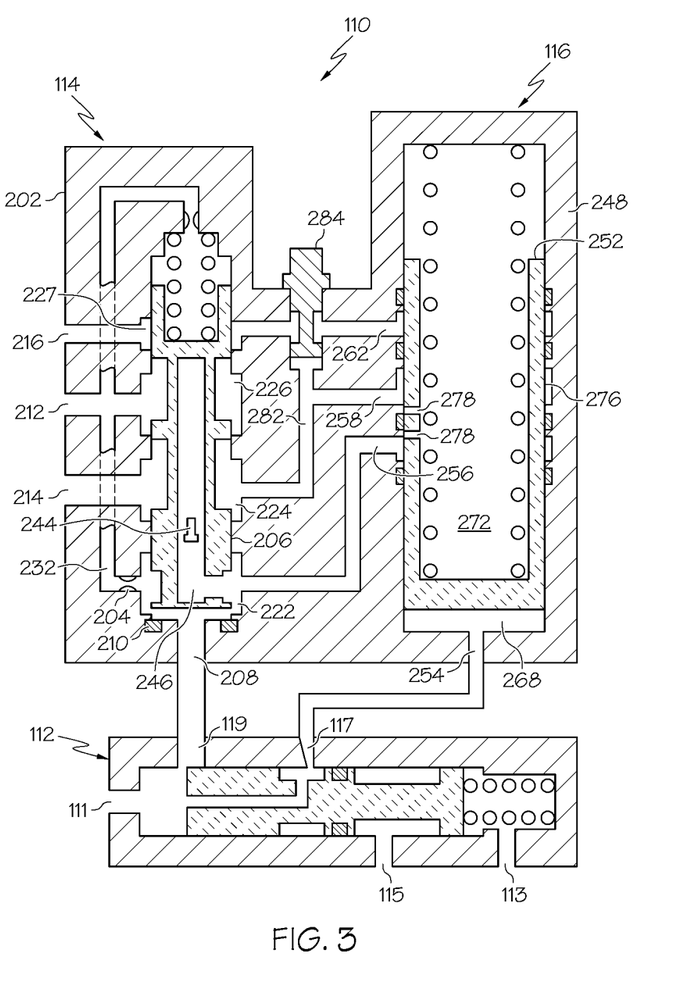

During engine startup, burn flow pressure begins to increase, causing the pressurizing valve 112 to open. As a result, and as depicted in FIG. 3, the burn flow inlet port 111 is in fluid communication with the burn flow outlet port 119, and thus with the inlet port 208 of the flow divider valve 114. When total burn flow pressure at the inlet port 208 reaches a first predetermined pressure, the flow divider valve element 206 will move to an open position. In an open position, up to a first predetermined open position, which is the position depicted in FIGS. 3 and 4 and corresponds to total burn flow pressure at the inlet port 208 being at a second predetermined pressure, the inlet port 208 is in fluid communication with the start nozzle manifold outlet port 212, via the start flow orifice 204. The inlet port 208 is additionally in fluid communication with the run nozzle manifold outlet port 214, via the internal channel 246 and the one or more flow regulation ports 244, but remains fluidly isolated from the staged nozzle manifold outlet port 216. In an open position up to this first predetermined open position, a constant pressure drop is maintained across the start flow orifice 204 by venting surplus flow to the run nozzle manifold 152-2 via the internal channel 246 and the one or more flow regulation ports 244. Fuel may also be supplied to the run nozzle manifold 152-2 via flow reintroduced by the ecology valve 116.

It may thus be appreciated that when fuel pressure at the inlet port 208 is between the first predetermined pressure and the second predetermined pressure, fuel flow through the start nozzle manifold outlet port 212 is substantially constant regardless of fuel flow into the inlet port 208. It will be appreciated that the precise amount of fuel flow through the start nozzle manifold outlet port 212 may vary slightly under these conditions. Flow variations of less than or equal to about 5% are considered to be substantially constant.

Figure 4:
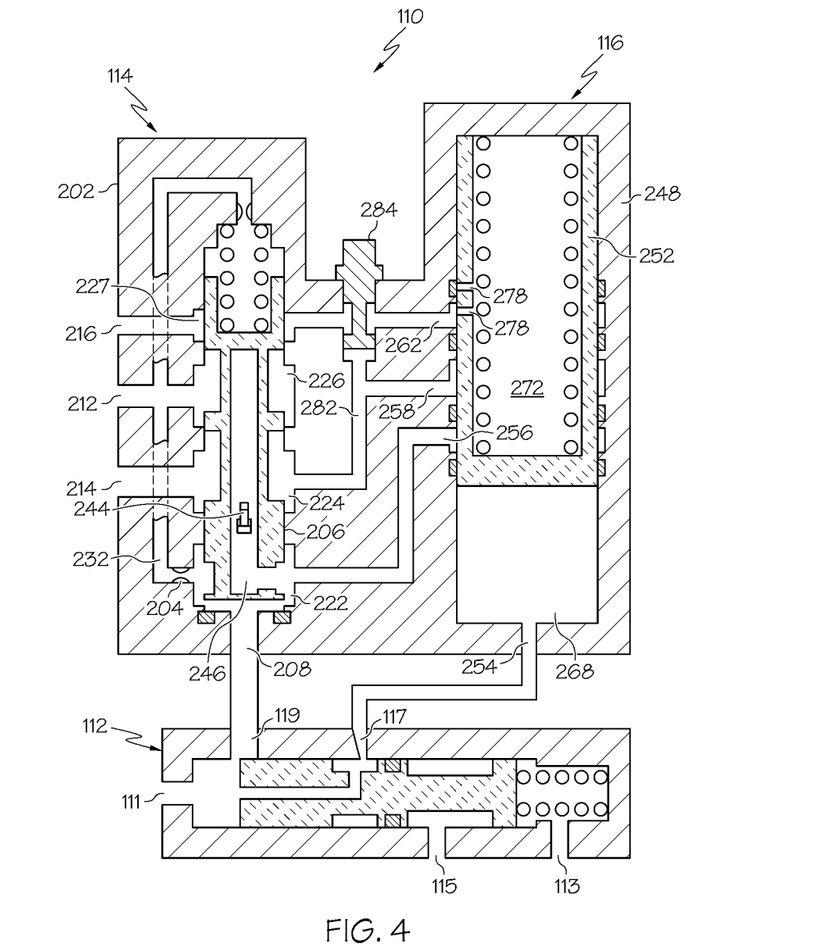
Figure 5:
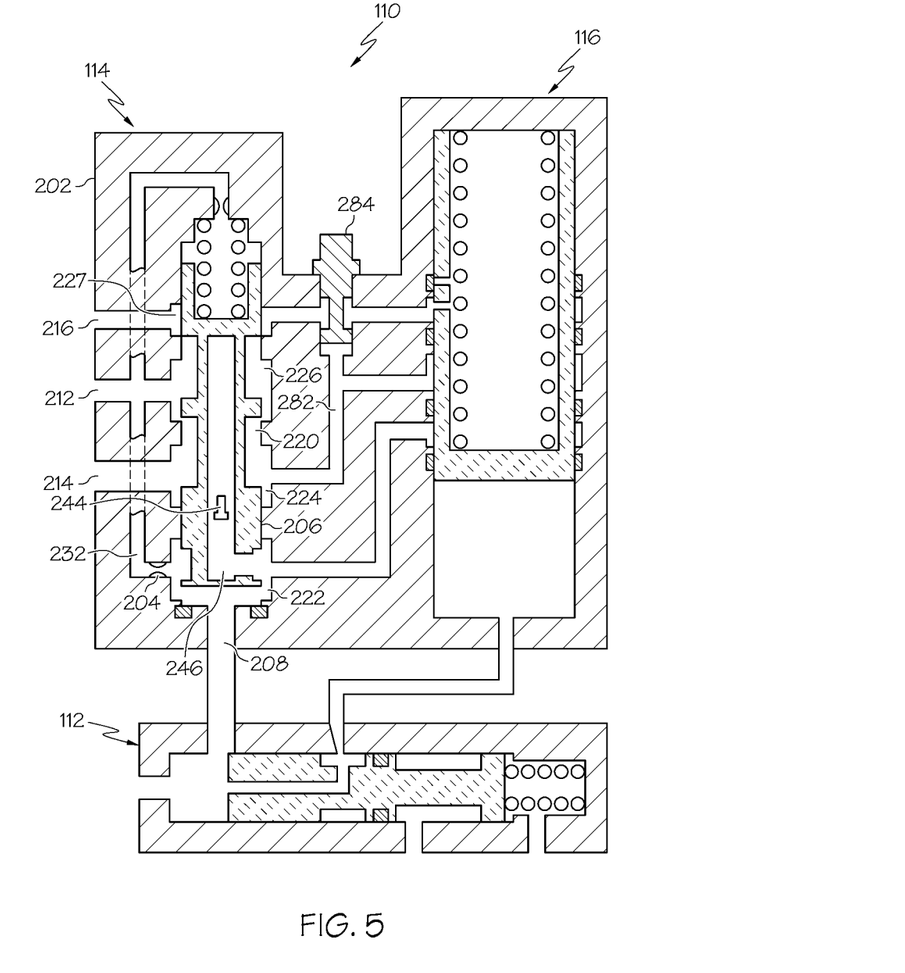
Figure 6:
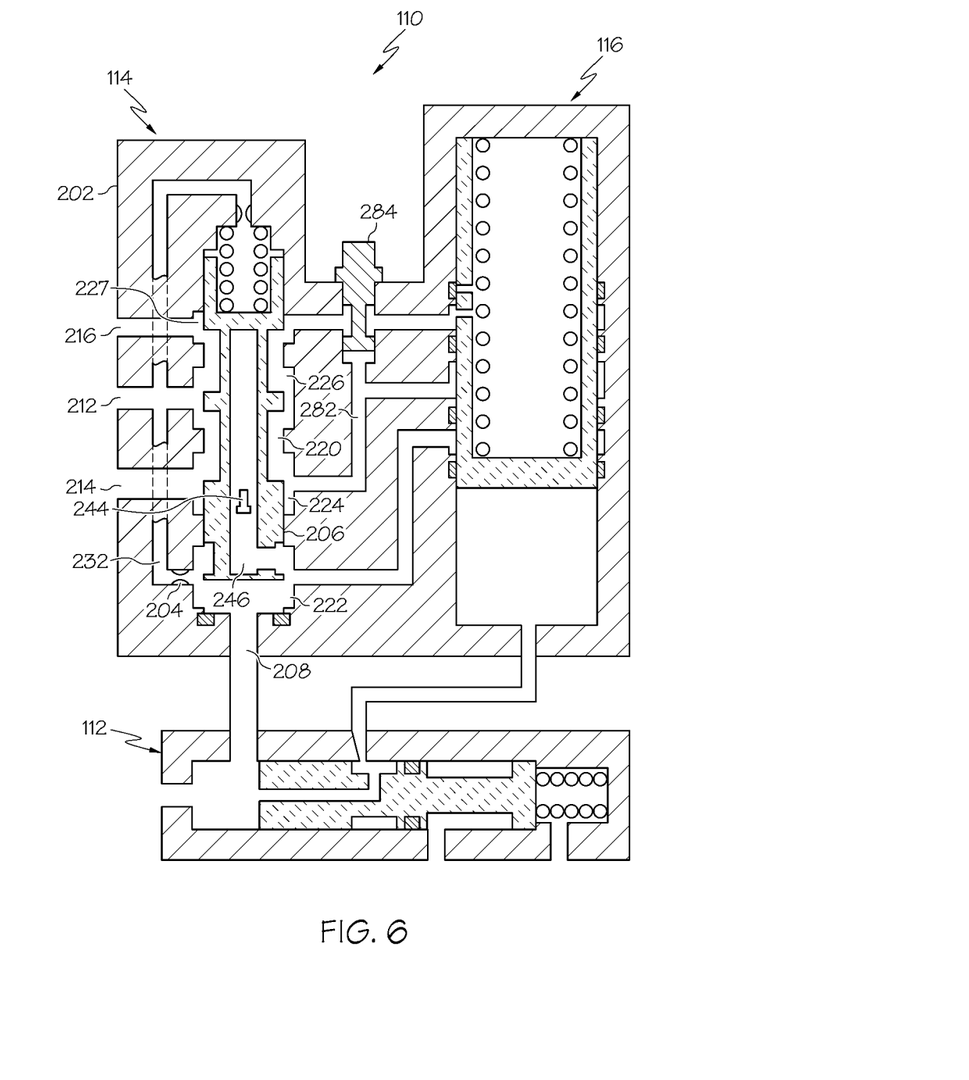

Also during engine startup, the pressurizing valve 112 is repositioned so that the burn flow inlet port 111 is in fluid communication with, and thus supplies high pressure fuel to, the ecology control pressure port 117. As a result, the ecology valve element 252 moves from the non-energized position (FIG. 2) into the fully-energized position (FIG. 4). As the ecology valve element 252 moves toward the fully-energized position, fuel that was stored in the variable volume fuel reservoir 272 is selectively reintroduced, via the flow orifices 278, to the fuel manifolds 152. As FIGS. 3 and 4 depict, fuel is first reintroduced to the start nozzle manifold 152-1 (via the inlet chamber 222), then to the run nozzle manifold 152-2 (via the run nozzle manifold chamber 224), and finally to the staged nozzle manifold 152-3 (via the staged nozzle manifold chamber 227).

The flow divider valve 114 is configured to ensure there is no effect on the constant start flow that is being directed to the start nozzle manifold 152-1. The configuration of the flow divider valve 114, and more particularly the flow divider valve element 206, compensates for the stored fuel being reintroduced to the run and staged nozzle manifolds 152-2, 152-3 by positioning itself to reduce the amount of total fuel flow being communicated to the run nozzle manifold 152-2, via the one or more flow regulation ports 244, proportional to the amount of burn flow being reintroduced by the ecology valve 116. Moreover, as the ecology valve element 252 is being moved to the fully-energized position, whatever amount of burn flow that is "robbed" to move the ecology valve element 252, that amount of burn flow is pushed out to the fuel manifolds, so the scheduled burn flow is still delivered.

Subsequent to the engine startup, and as burn flow pressure increases beyond the second predetermined pressure, the flow divider valve element 206 will open further. When the flow divider valve element 206 is opened beyond the first predetermined position and up to a second predetermined opened position, which is the position depicted in FIG. 5 and corresponds to total burn flow pressure at the inlet port 208 being at a third predetermined pressure, fuel pressure at the start nozzle manifold outlet port 212 and the run nozzle manifold outlet port 214 are equalized. More specifically, with the flow divider valve element 206 in a position beyond the second predetermined position, the inlet port 208 is in fluid communication with the start nozzle manifold outlet port 212, via the start flow orifice 204, and remains fluidly isolated from the staged nozzle manifold outlet port 216. In addition, the start nozzle manifold outlet port 212 is in fluid communication with the run nozzle manifold outlet port 214 via the valve chamber 220. The equalized pressure at the start nozzle manifold outlet port 212 and the run nozzle manifold outlet port 214 maintains equal flow to the start and run nozzle manifolds 152-1, 152-2.

If burn flow pressure further increases beyond the third predetermined pressure, the flow divider valve element 206 will open beyond the second predetermined position. If the flow divider valve element 206 is opened beyond the second predetermined position, such as the position depicted in FIG. 6, the inlet port 208 is in fluid communication with the start nozzle manifold outlet port 212, via the start flow orifice 204. However, in addition to being in fluid communication with the run nozzle manifold outlet port 214, via the valve chamber 220, the start nozzle manifold outlet port 212 is in fluid communication with the staged nozzle manifold outlet port 216, via the valve chamber 220. As a result, fuel pressure is equalized at the start nozzle manifold outlet port 212, the run nozzle manifold outlet port 214, and the staged nozzle manifold outlet port 216. Again, this equalized pressure maintains equal flow to the start, run, and staged nozzle manifolds 152-1, 152-2, 152-3.

The flow divider and ecology system 110 is additionally configured to allow the above-described fuel staging functionality to be selectively enabled and disabled. To facilitate this functionality, the flow divider and ecology system 110 additionally includes a chamber equalization channel 282 and a nozzle staging on/off device 284. The chamber equalization channel 282 extends between the run nozzle manifold chamber 224 and the staged nozzle manifold chamber 227. The nozzle staging on/off device 284 is disposed within the chamber equalization channel 282 and is movable between an ON position, which is the position depicted in FIGS. 2-6, and an OFF position, which is the position depicted in FIG. 7. As may be appreciated, nozzle staging is enabled when the nozzle staging on/off device 284 is in the ON position, and is disabled when the nozzle staging on/off device 284 is in the OFF position.

It will be appreciated that the nozzle staging on/off device 284 may be variously implemented. For example, it could be implemented using a manually rotatable slug, such as in the depicted embodiment, or it could be implemented using slug (or other device) that is actuated remotely. Various types of electrical, mechanical, electromechanical, hydraulic, or pneumatic actuators could be used to actuate the nozzle staging on/off device 284. The actuator could be controlled via commands supplied from, for example, an engine control, such as a FADEC (full authority digital engine control). This would allow for discrete command of fuel staging verses total flow commanded nozzle staging.

Figure 7:
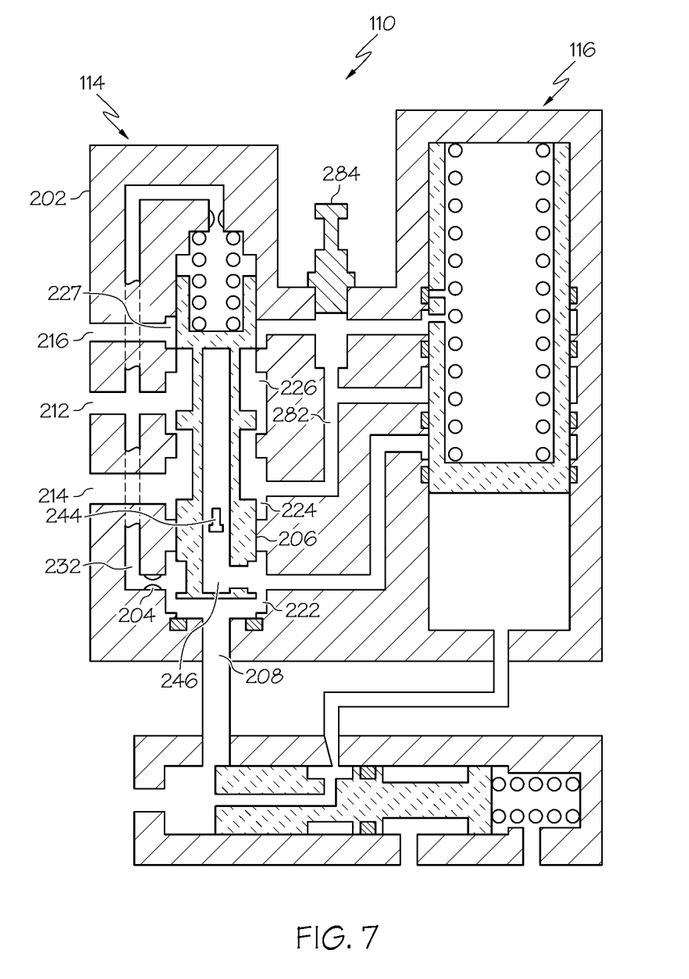

No matter how the position of the nozzle staging on/off device 284 is controlled, and referring now to FIG. 7, when the nozzle staging on/off device 284 is positioned to the OFF position, the chamber equalization channel 282 equalizes the pressures in the run nozzle manifold chamber 224 and the staged nozzle manifold chamber 227. As a result, the flow divider valve 114 no longer implements the nozzle staging override functionality. Instead, whenever the flow divider valve element 206 is opened beyond the first predetermined position, fuel pressure will be equalized at the start nozzle manifold outlet port 212, the run nozzle manifold outlet port 214, and the staged nozzle manifold outlet port 216.

The flow divider and ecology system described herein controls flow to gas turbine engine start nozzles during engine startup to a predetermined constant flow rate, with the remainder directed to the run nozzles. The system additionally equalizes the total burn flow to the start and run fuel nozzles after engine startup, and is configured such that the ecology valve does not adversely impact scheduled burn flow to the primary and secondary fuel nozzles during engine startup. The system further allows fuel staging to be selectively overridden.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flow divider valve for controlling fuel flow to a gas turbine engine that includes a start nozzle manifold and a run nozzle manifold, the flow divider valve comprising:
a valve body including an inlet port, a start nozzle manifold outlet port, a run nozzle manifold outlet port, and an inner surface that defines a valve chamber;
a start flow orifice disposed between the inlet port and the start nozzle manifold outlet port; and
a flow divider valve element disposed within the valve chamber and movable therein between a closed position and a plurality of open positions, the flow divider valve element including an inner surface, an outer surface, and a flow regulation port, the inner surface defining an internal channel, the flow regulation port extending through the flow divider valve element between the inner surface and the outer surface and providing continuous fluid communication between the internal channel and the run nozzle manifold outlet port when the flow divider valve element is in the plurality of open positions;
wherein the flow divider valve element is configured such that:
when the flow divider valve element is in the closed position, the inlet port is fluidly isolated from the start nozzle manifold outlet port, the run nozzle manifold outlet port, and the internal channel, and when fuel pressure at the inlet port is between a first predetermined pressure and a second predetermined pressure:
the flow divider valve element is in one or more of the open positions and the inlet port is in fluid communication with (i) the start nozzle manifold outlet port via the start flow orifice and (ii) the run nozzle manifold outlet port via the internal flow channel and the flow regulation port, and
fuel flow through the start flow nozzle manifold outlet port is substantially constant regardless of fuel flow into the inlet port; and wherein:
the valve body and flow divider valve element are configured to define, within the valve chamber, an inlet chamber, a run nozzle manifold chamber, and a start nozzle manifold chamber,
the start nozzle manifold chamber is in fluid communication with the inlet chamber, via the start flow orifice, regardless of flow divider valve element position,
the run nozzle manifold chamber is in fluid communication with the inlet chamber, via the internal flow channel and the flow regulation port, when the flow divider valve element is in the plurality of open positions, and
the start nozzle manifold chamber and the run nozzle manifold chamber are in fluid communication with each other when fuel pressure at the inlet port exceeds the second predetermined pressure.

2. The flow divider valve of claim 1, wherein the flow divider valve element is further configured such that when fuel pressure at the inlet port exceeds the second predetermined pressure, the flow divider valve element is in one or more of the open positions and the start nozzle manifold outlet port is in fluid communication with the run nozzle manifold outlet port via the valve chamber.

3. The flow divider valve of claim 1, wherein:
the valve body and flow divider valve element are further configured to define a control chamber; and
the flow divider valve further comprises a valve bias spring disposed within the control chamber, the valve bias spring engaging the valve body and the flow divider valve element and urging the flow divider valve element toward the closed position.

4. The flow divider valve of claim 3, wherein the control chamber is in continuous fluid communication with the inlet chamber, via the start flow orifice, and with the start nozzle manifold chamber.

5. The flow divider valve of claim 1, further comprising:
an ecology valve body including a control pressure port, a burn flow port, a run nozzle port, and an inner surface that defines an ecology valve chamber, the burn flow port in fluid communication with the internal channel of the flow divider valve element, the run nozzle port in fluid communication with the run nozzle manifold outlet port; and
an ecology valve element disposed within the ecology valve chamber and movable therein between a plurality of positions, the ecology valve element dividing the ecology valve chamber into a variable volume control chamber and a variable volume fuel reservoir, the variable volume control chamber in fluid communication with the control pressure port, the ecology valve element configured, in response to fuel pressure at the control pressure port, to move and selectively place the variable volume fuel reservoir in fluid communication with one of the burn flow port and the run nozzle port.

6. The flow divider valve of claim 1, wherein:
the flow divider valve is for controlling fuel flow to a gas turbine engine that additionally includes a staged nozzle manifold;
the valve body further includes a staged nozzle manifold outlet port; and
the flow divider valve element is further configured such that:
the staged nozzle manifold outlet port is fluidly isolated from the inlet port when (i) the flow divider valve element is in the closed position and (ii) when fuel pressure at the inlet port is between the first predetermined pressure and a third predetermined pressure, the third predetermined pressure greater than the second predetermined pressure, and
the staged nozzle manifold outlet port is in fluid communication with the start nozzle manifold outlet port and the run nozzle manifold outlet port, via the valve chamber, when fuel pressure at the inlet port exceeds the third predetermined pressure.

7. The flow divider valve of claim 6, further comprising:
a chamber equalization channel in fluid communication with the run nozzle manifold outlet port and the staged nozzle manifold outlet port; and
a nozzle staging on/off device disposed within the chamber equalization channel and movable between a first position and a second position,
wherein:
when the nozzle staging on/off device is in the first position, fluid communication between the run nozzle manifold outlet port and the staged nozzle manifold outlet port, via the chamber equalization channel, is blocked, and
when the nozzle staging on/off device is in the second position, the run nozzle manifold outlet port and the staged nozzle manifold outlet port are in fluid communication, via the chamber equalization channel.

8. The flow divider valve of claim 7, further comprising:
an ecology valve body including a control pressure port, a burn flow port, a run nozzle port, a staged nozzle port, and an inner surface that defines an ecology valve chamber, the burn flow port in fluid communication with the internal channel of the flow divider valve element, the run nozzle port in fluid communication with the run nozzle manifold outlet port, and the staged nozzle port in fluid communication with staged nozzle manifold outlet port; and
an ecology valve element disposed within the ecology valve chamber and movable therein between a plurality of positions, the ecology valve element dividing the ecology valve chamber into a variable volume control chamber and a variable volume fuel reservoir, the variable volume control chamber in fluid communication with the control pressure port, the ecology valve element configured, in response to fuel pressure at the control pressure port, to move and selectively place the variable volume fuel reservoir in fluid communication with one of the burn flow port, the run nozzle port, and the staged nozzle port.

9. A flow divider and ecology system for a gas turbine engine that includes a start nozzle manifold and a run nozzle manifold, the system comprising:
a flow divider valve body including an inlet port, a start nozzle manifold outlet port, a run nozzle manifold outlet port, a start flow orifice disposed between the inlet port and the start nozzle manifold outlet port, and an inner surface that defines a flow divider valve chamber;

a flow divider valve element disposed within the flow divider valve chamber and movable therein between a closed position and a plurality of open positions, the flow divider valve element including an inner surface, an outer surface, and a flow regulation port, the inner surface defining an internal channel, the flow regulation port extending through the flow divider valve element between the inner surface and the outer surface and providing continuous fluid communication between the internal channel and the run nozzle manifold outlet port when the flow divider valve element is in the plurality of open positions;

an ecology valve body including a control pressure port, a burn flow pressure port, a run nozzle port, and an inner surface that defines an ecology valve chamber, the burn flow pressure port in fluid communication with the internal channel of the flow divider valve element, the run nozzle pressure port in fluid communication with the run nozzle manifold outlet port; and an ecology valve element disposed within the ecology valve chamber and movable therein between a plurality of positions, the ecology valve element dividing the ecology valve chamber into a variable volume control chamber and a variable volume fuel reservoir, the variable volume control chamber in fluid communication with the control pressure port, the ecology valve element configured, in response to fuel pressure at the control pressure port, to selectively place the variable volume fuel reservoir in fluid communication with one of the burn flow pressure port and the run nozzle pressure port;

wherein the flow divider valve element is configured such that:

when the flow divider valve element is in the closed position, the inlet port is fluidly isolated from the start nozzle manifold outlet port, the run nozzle manifold outlet port, and the internal channel, and when fuel pressure at the inlet port is between a first predetermined pressure and a second predetermined pressure:

the flow divider valve element is in one or more of the open positions and the inlet port is in fluid communication with (i) the start nozzle manifold outlet port via the start flow orifice and (ii) the run nozzle manifold outlet port via the internal flow channel and the flow regulation port, and fuel flow through the start flow nozzle manifold outlet port is substantially constant regardless of fuel flow into the inlet port; and wherein:

the flow divider valve body and flow divider valve element are configured to define, within the valve chamber, an inlet chamber, a run nozzle manifold chamber, via the start flow orifice, regardless of flow divider valve element position, the run nozzle manifold chamber is in fluid communication with the inlet chamber, via the internal flow channel and the flow regulation port, when the flow divider valve element is in the plurality of open positions, and the start nozzle manifold chamber and the run nozzle manifold chamber and are in fluid communication with each other when fuel pressure at the inlet port exceeds the second predetermined pressure.

10. The flow divider and ecology system of claim 9, wherein the flow divider valve element is further configured such that when fuel pressure at the inlet port exceeds the second predetermined pressure, the flow divider valve element is in one or more of the open positions and the start nozzle manifold outlet port is in fluid communication with the run nozzle manifold outlet port via the valve chamber.

11. The flow divider and ecology system of claim 9, wherein:

the valve body and flow divider valve element are further configured to define a control chamber; and the flow divider valve further comprises a valve bias spring disposed within the control chamber, the valve bias spring engaging the valve body and the flow divider valve element and urging the flow divider valve element toward the closed position.

12. The flow divider and ecology system of claim 11, wherein the control chamber is in continuous fluid communication with the inlet chamber, via the start flow orifice, and with the start nozzle manifold chamber.

13. The flow divider and ecology system of claim 9, wherein:

the flow divider system is for controlling fuel flow to a gas turbine engine that additionally includes a staged nozzle manifold;

the valve body further includes a staged nozzle manifold outlet port; and the flow divider valve element is further configured such that:

the staged nozzle manifold outlet port is fluidly isolated from the inlet port when (i) the flow divider valve element is in the closed position and (ii) when fuel pressure at the inlet port is between the first predetermined pressure and a third predetermined pressure, the third predetermined pressure greater than the second predetermined pressure, and the staged nozzle manifold outlet port is in fluid communication with the start nozzle manifold outlet port and the run nozzle manifold outlet port, via the valve chamber, when fuel pressure at the inlet port exceeds the third predetermined pressure.

14. The flow divider and ecology system of claim 13, further comprising:

a chamber equalization channel in fluid communication with the run nozzle manifold outlet port and the staged nozzle manifold outlet port; and a nozzle staging on/off device disposed within the chamber equalization channel and movable between a first position and a second position, wherein:

when the nozzle staging on/off device is in the first position, fluid communication between the run nozzle manifold outlet port and the staged nozzle manifold outlet port, via the chamber equalization channel, is blocked, and when the nozzle staging on/off device is in the second position, the run nozzle manifold outlet port and the staged nozzle manifold outlet port are in fluid communication, via the chamber equalization channel.

* * * * *